(12) United States Patent
Thakur et al.

(10) Patent No.: US 8,538,946 B1
(45) Date of Patent: Sep. 17, 2013

(54) CREATING MODEL OR LIST TO IDENTIFY QUERIES

(75) Inventors: Shashidhar Anil Thakur, Saratoga, CA (US); Ashutosh Shukla, Mountain View, CA (US); Pavel Nalivayko, Adliswil (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/552,364

(22) Filed: Jul. 18, 2012

Related U.S. Application Data (60) Provisional application No. 61/552,671, filed on Oct. 28, 2011.

(51) Int. Cl.
*G06F 17/30* (2006.01)
*G06F 7/00* (2006.01)

(52) U.S. Cl.
USPC .......................................................... 707/706

(58) Field of Classification Search
USPC ................................................ 707/706, 802
See application file for complete search history.

(56) References Cited

U.S. PATENT DOCUMENTS

| | | | |
|---|---|---|---|
| 8,041,730 B1* | 10/2011 | Upstill et al. | 707/769 |
| 2009/0083243 A1* | 3/2009 | Heymans et al. | 707/4 |
| 2012/0233196 A1* | 9/2012 | Wu et al. | 707/760 |

* cited by examiner

*Primary Examiner* — Kuen Lu
(74) *Attorney, Agent, or Firm* — Harrity & Harrity, LLP (57) ABSTRACT

A server is configured to determine translations of queries from a first language into a second language, associated with a first specialized search engine, to obtain translated queries. The server is also configured to use a first model, associated with the first specialized search engine, to determine values for the translated queries. A value of the values, corresponding to a translated query of the translated queries, reflects a probability that the translated query is a type of query for which first specialized search results are responsive. The server is configured to create training data based on the queries and the values, and to create a second model based on the training data. The second model may be used to predict whether a particular query, received by the web search engine, is the type of query for which second specialized search results, from a second specialized search engine, are responsive.

20 Claims, 5 Drawing Sheets

CREATING MODEL OR LIST TO IDENTIFY QUERIES

RELATED APPLICATION

This application claims priority to Provisional Patent Application No. 61/552,671, filed Oct. 28, 2011, the contents of which are herein incorporated by reference.

BACKGROUND

An operator can operate a web search engine and a specialized search engine, such as a product search engine, for a particular country. The operator has access to statistics that can be used to determine whether a query submitted to the web search engine is a search query for which results from the specialized search engine are responsive. However, when the operator launches a new specialized search engine for a new county, the operator does not have access to such statistics that can be used for the new specialized search engine.

SUMMARY

According to one aspect, a method may include retrieving, by at least one of one or more computing devices, a particular quantity of queries received by a first web search engine. The queries may be in a first language. The method may further include determining, by at least one of the one or more computing devices, translations of the queries from the first language into a second language associated with a first specialized search engine to obtain translated queries. The method may also include using, by at least one of the one or more computing devices, a first model, associated with the first specialized search engine, to determine values for the translated queries. A first value of the values, corresponding to a first translated query of the translated queries, may reflect a probability that the first translated query is a type of query for which first specialized search results are responsive. The method may also include creating, by at least one of the one or more computing devices, training data based on the queries and the values, and creating, by at least one of the one or more computing devices, rules for a second model based on the training data. The second model may be used to predict whether a particular query, received by the first web search engine, is the type of query for which second specialized search results, from a second specialized search engine, are responsive.

According to another aspect, a computer-readable medium may include instructions, which when executed by at least one processor, cause the at least one processor to: retrieve first strings from a first index associated with a specialized search engine; sort the first strings based on frequencies of the first strings in the first index; create a first list based on the sorted first strings; retrieve second strings from a second index associated with a web search engine; sort the second strings based on frequencies of the second strings in the second index; create a second list based on the sorted second strings; identify one or more strings that are in the first list and that are not in the second list; create, based on the identified one or more strings, a list of strings associated with the specialized search engine; and use the list of strings to determine whether a query is a search query for which results from the specialized search engine are responsive.

According to yet another aspect, a system may include a processor. The processor may retrieve queries received by a web search engine. The queries may be in a first language. The processor may further determine translations of the queries from the first language into a second language, associated with a first specialized search engine, to obtain translated queries. The processor may also use a first model, associated with the first specialized search engine, to determine values for the translated queries. A first value of the values, corresponding to a first translated query of the translated queries, may reflect a probability that the first translated query is a type of query for which first specialized search results are responsive. The processor may also create training data based on the queries and the values, and may create a second model based on the training data. The second model may be used to predict whether a particular query, received by the web search engine, is the type of query for which second specialized search results, from a second specialized search engine, are responsive. The first specialized search engine may be different from the second specialized search engine.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements.

A specialized search engine may refer to any search engine that allow users to search for a particular type of information, such as product-related information, images, news-related information, etc. When a query is submitted to a specialized search engine, the specialized search engine may retrieve results, for the query, from a specialized index that includes specialized entries, which are all associated with a particular type of information.

An implementation described herein may create one or more new models for determining whether a query is a particular type of query associated with a new specialized search engine. For example, a computer device may retrieve queries, which are in a first language, from a web search engine. The new specialized search engine and the web search engine may be associated with domains that include the same country code top-level domain, such as ".ru" for the Russian Federation. The computer device may determine translations of the queries from the first language into a second language associated with an existing specialized search engine, which is associated with a domain that includes a different country code top-level domain, such as ".us" for the United States. The computer device may use existing models, associated with the existing specialized search engine, to determine values for the translated queries. The computer device may create training data based on the queries and the values, and may use the training data to create one or more models that are associated with the new specialized search engine.

As a result, an operator of the new specialized search engine does not have to wait until the new specialized search engine collects its own statistics. Furthermore, the operator does not have to use manual efforts to create lists of queries of the particular type of query.

Figure 1:
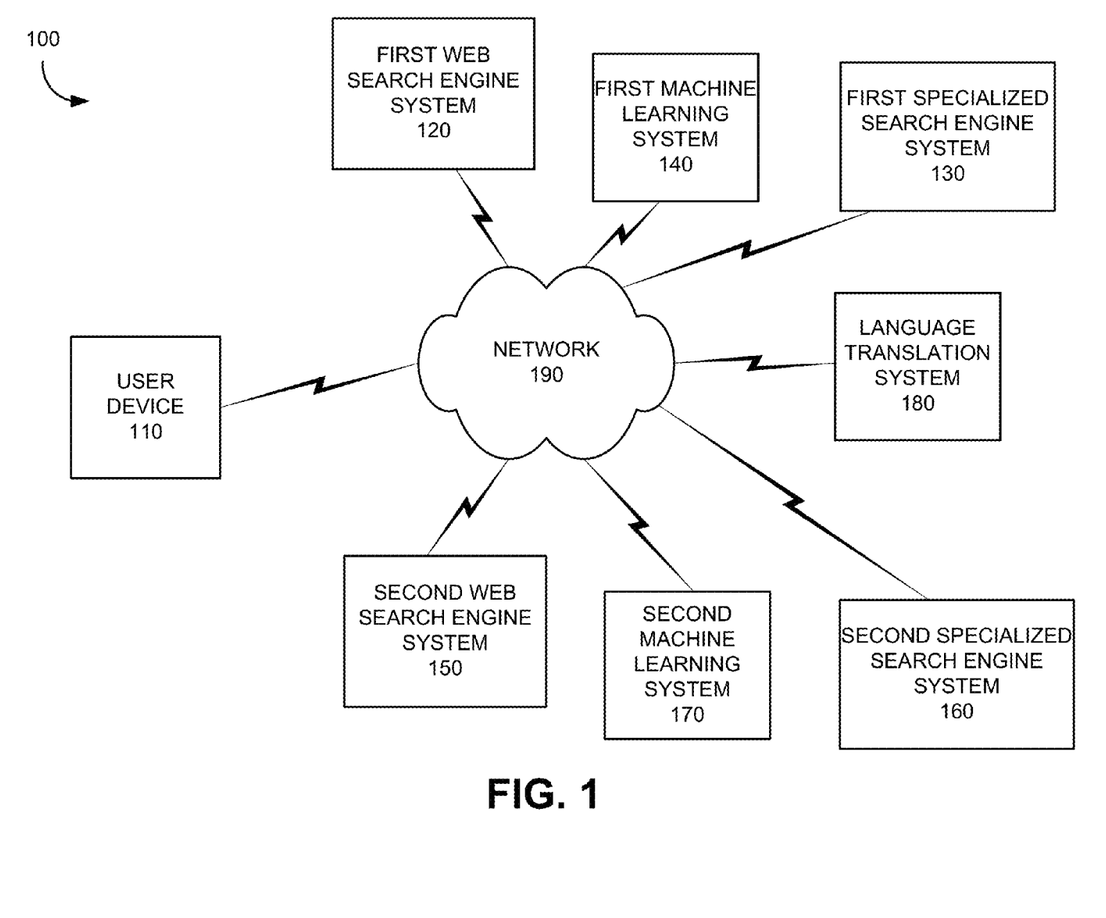
FIG. 1 is a diagram of an example environment in which systems and/or methods described herein may be implemented.

FIG. 1 is a diagram of an example environment in which systems and/or methods described herein may be implemented. As shown in FIG. 1, environment 100 may include a user device 110, a first web search engine system 120, a first specialized search engine system 130, a first machine learning system 140, a second web search engine system 150, a second specialized search engine system 160, a second machine learning system 170, a language translation system 180, and a network 190. In practice, environment 100 may include additional systems/devices, fewer systems/devices, different systems/devices, or differently arranged systems/devices than are shown in FIG. 1. In some implementations, one or more of the systems/devices of environment 100 may perform one or more functions described as being performed by another one or more of the systems/devices of environment 100.

Furthermore, two or more of the systems/devices, of FIG. 1, may be implemented within a single device, or a single system/device may be implemented as multiple, distributed devices. Also, systems/devices of environment 100 may interconnect via wired and/or wireless connections. In other words, any two systems/devices, of environment 100, may communicate via a wired connection, a wireless connection, or a combination of a wired connection and a wireless connection.

User device 110 may include a computation and/or a communication device, such as a communication device that is capable of communicating, via network 190, with second web search engine system 150 and second specialized search engine system 160. In one implementation, user device 110 may take the form of a web service terminal, a personal computer, a laptop, a handheld computer, a smart phone, a mobile telephone device, a personal digital assistant (PDA), a personal media player, a set-top box (STB) connected to a video display device (e.g., a television), or any other type of computation or communication device capable of transmitting data to, for example, second specialized search engine system 160. In another implementation, user device 110 may represent multiple devices operated by a user, including, for example, a personal computer and a mobile device.

First web search engine system 120 may include one or more server devices and/or one or more computer systems that process, search, and/or index documents that are available on a network, such as the Internet. In one example, first web search engine system 120 may include a crawler component, an indexer component, a web search index, and/or a search engine component. The crawler component may access, fetch, index, search, and/or maintain documents. The crawler component may implement a data aggregation service by crawling a corpus of documents, such as web pages, hosted by various web servers.

A document may refer to any machine-readable and machine-storable work product. A document may include, for example, an e-mail, a website, a business listing, a file, a combination of files, one or more files with embedded links to other files, a news group posting, a blog, an advertisement, an image, a video, a digital map, etc. In the context of the Internet, a document may refer to a web page. Documents may include textual information, embedded information, such as meta information, images, hyperlinks, etc., and/or embedded instructions, such as Javascript, etc.

The indexer component may index the documents to create the web search index. In one implementation, the indexer may extract text from the content of the crawled document, extract individual terms or other data from the text, and sort those terms or other data (e.g., alphabetically) into the web search index. In other implementations, the indexer may index the documents by using other standard indexing techniques.

The search engine component may provide a web page with a user interface for first web search engine system 120. The search engine component may receive a query, submitted to the user interface, from user device 110. The search engine component may search the web search index for specific documents whose content is responsive to the query. The search engine component may generate results associated with the specific documents. The search engine component may provide the results to user device 110. User device 110 may display the results in, for example, a browser window. Each one of the results may include an address associated with a document, a snippet of content extracted from the document, and/or other information associated with the document and/or the address.

First specialized search engine system 130 may include one or more server devices and/or one or more computer systems that allow users to search for a particular type of information, such as product-related information, images, news-related information, etc. In the description to follow, first specialized search engine system 130 will be described in the context of a product search engine system. It should be understood, however, that the description applies to other types of information. First specialized search engine system 130 may include a submission component, a products search index, and a products search engine component.

The submission component may receive information from on-line merchants and/or third parties about an item and an address that a user of user device 110 may use to access a document, such as a web page, associated with the item. In the product context, for example, the information about the item may include, for example, an identifier of a product, a brand of the product, a type of the product, a price of the product, terms associated with the product, etc.

First specialized search engine system 130 may create an entry for an address in the products search index, based on the address and information associated with the address. The products search index may include entries that store information about products and corresponding addresses that a user may use to access documents associated with the products.

The products search engine component may receive a product-related query from user device 110 or from first machine learning system 140. The products search engine component may search the products search index, based on the received product-related query, to match terms of the product-related query with terms associated with entries in the products search index. The products search engine component may generate results, which correspond to product-related documents that are responsive to the product-related query. The products search engine component may provide the results to user device 110 or to first machine learning system 140. The user may use user device 110 to access the product-related documents identified in the results.

First machine learning system 140 may include one or more server devices and/or one or more computer systems that determine whether a query is a particular type of query for which results are sought from first specialized search engine system 130. First machine learning system 140 may create and train models that are used to determine whether the query is the particular type of query. In one example, first machine learning system 140 may receive a query from first web search engine system 120. First machine learning system 140 may use the models to determine whether the query is the particular type of query. When the query is the particular type of query, first machine learning system 140 may retrieve results for the query from first specialized search engine system 130. First machine learning system 140 may generate a search result document that includes one or more of the retrieved results—hereinafter, referred to as a "specialized search result document." First machine learning system 140 may transmit the specialized search result document to first web search engine system 120. First web search engine system 120 may include the specialized search result document as part of a search result document generated for the query. A user may select a link in the specialized search result document to access a document identified by first specialized search engine system 130.

First web search engine system 120, first specialized search engine system 130, and first machine learning system 140 may be associated with domains that include a particular country code top-level domain, such as ".us" for the United States. First web search engine system 120 and first specialized search engine system 130 may, mostly, receive queries from user devices 110 of a particular country, such as the United States, that is associated with the particular country code top-level domain. The received queries may be, mostly, in a particular language, such as English, that is associated with the particular country code top-level domain and the particular country.

Second web search engine system 150, second specialized search engine system 160, and second machine learning system 170 may be associated with domains that include a different country code top-level domain, such as ".ru" for the Russian Federation, which is different from the particular country code top-level domain. Second web search engine system 150 and second specialized search engine system 160 may, mostly, receive queries from user devices 110 of a different country, such as the Russian Federation, that is associated with the different country code top-level domain. The queries, received by web search engine system 150 and second specialized search engine system 160, may be, mostly, in a different language, such as Russian, that is associated with the different country code top-level domain and the different country.

Second web search engine system 150, second specialized search engine system 160, and second machine learning system 170 may include the same type of components and perform the same type of functions as first web search engine system 120, first specialized search engine system 130, and first machine learning system 140, respectively. In one implementation, first web search engine system 120 and second web search engine system 150 may share one or more, or all, components. Assume, for this example, that second specialized search engine system 160 and/or second machine learning system 170 become operational in the different country after first web search engine system 120 and/or first specialized search engine system 130 are operational in the particular country.

Language translation system 180 may include one or more server devices and/or one or more computer systems that translate text from one language into another language. For example, language translation system 180 may translate queries received by second web search engine system 150 from the different language, associated with second web search engine system 150, into the particular language, associated with first specialized search engine system 130.

Network 190 may include a single network, multiple networks of a same type, or multiple networks of different types. For example, network 190 may include one or more of: a direct connection between devices/components, a local area network (LAN), a wide area network (WAN) (e.g., the Internet), a metropolitan area network (MAN), a wireless network (e.g., a general packet radio service (GPRS) network), a telephone network (e.g., a Public Switched Telephone Network or a cellular network), a subset of the Internet, an ad hoc network, or any combination of the aforementioned networks.

Figure 2:
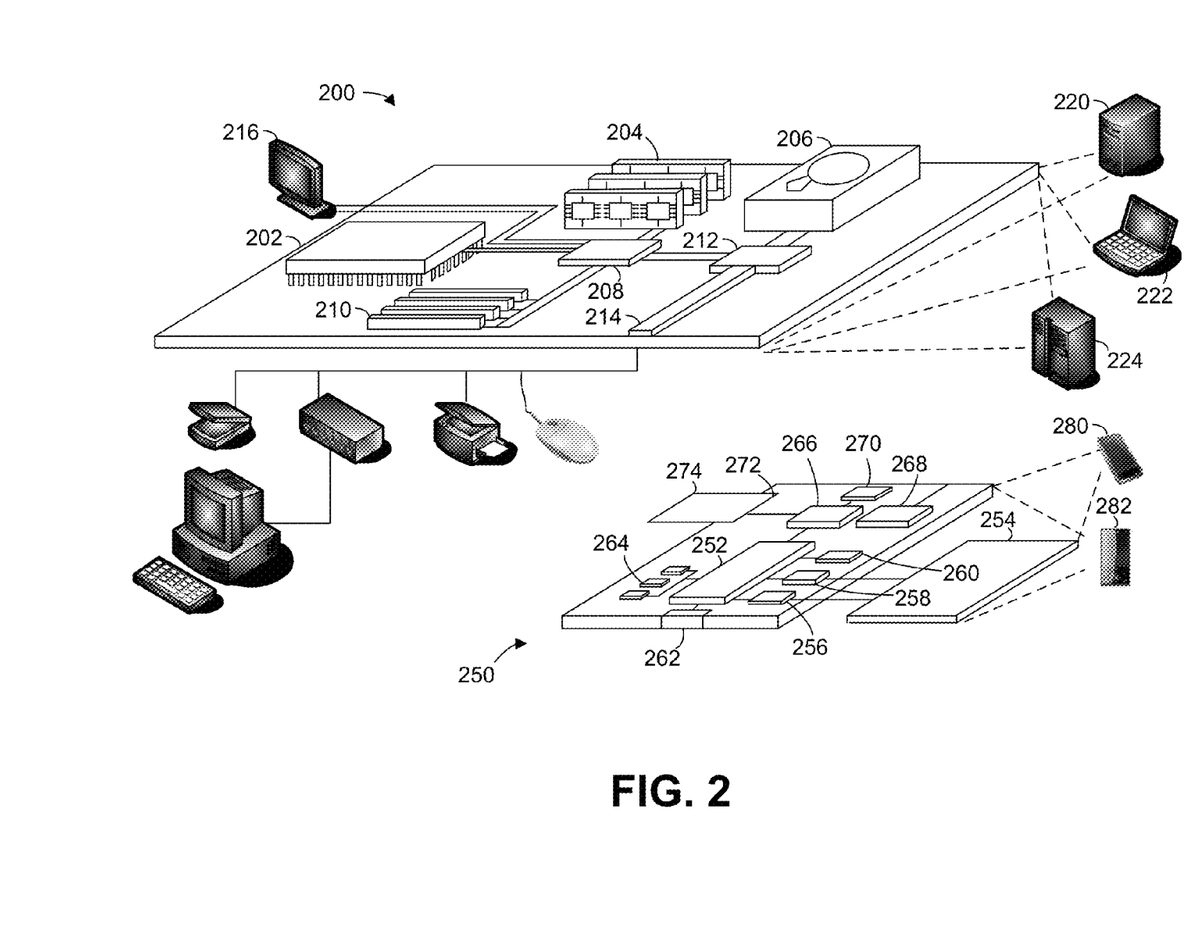
FIG. 2 illustrates an example of a computing device and a mobile computing device.

FIG. 2 is a diagram that shows an example of a computing device 200 and a mobile computing device 250, which may be used with the techniques described herein. Computing device 200 may correspond to, for example, user device 110, first web search engine system 120, first specialized search engine system 130, first machine learning system 140, second web search engine system 150, second specialized search engine system 160, second machine learning system 170, and/or language translation system 180. Mobile computing device 250 may correspond to, for example, user device 110.

Computing device 200 is intended to represent various forms of digital computers, such as laptops, desktops, workstations, personal digital assistants, servers, blade servers, mainframes, and other appropriate computers. Mobile computing device 250 is intended to represent various forms of mobile devices, such as personal digital assistants, cellular telephones, smart phones, and other similar computing devices. The components shown here, their connections and relationships, and their functions, are meant to be examples only, and are not meant to limit implementations described and/or claimed in this document.

Computing device 200 may include a processor 202, memory 204, a storage device 206, a high-speed interface 208 connecting to memory 204 and high-speed expansion ports 210, and a low speed interface 212 connecting to low speed bus 214 and storage device 206. Each of the components 202, 204, 206, 208, 210, and 212, may be interconnected using various busses, and may be mounted on a common motherboard or in other manners as appropriate. Processor 202 may process instructions for execution within computing device 200, including instructions stored in the memory 204 or on storage device 206 to display graphical information for a graphical user interface (GUI) on an external input/output device, such as display 216 coupled to high speed interface 208. In another implementation, multiple processors and/or multiple buses may be used, as appropriate, along with multiple memories and types of memory. Also, multiple computing devices 200 may be connected, with each device providing portions of the necessary operations (e.g., as a server bank, a group of blade servers, or a multi-processor system, etc.).

Memory 204 may store information within computing device 200. In one implementation, memory 204 may include a volatile memory unit or units. In another implementation, memory 204 may include a non-volatile memory unit or units. Memory 204 may also be another form of computer-readable medium, such as a magnetic or optical disk. A computer-readable medium may be defined as a non-transitory memory device. A memory device may include memory space within a single physical memory device or spread across multiple physical memory devices.

Storage device 206 may provide mass storage for computing device 200. In one implementation, storage device 206 may include a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described below. The information carrier may include a computer or machine-readable medium, such as memory 204, storage device 206, or memory included within processor 202.

High speed controller 208 may manage bandwidth-intensive operations for computing device 200, while low speed controller 212 may manage lower bandwidth-intensive operations. Such allocation of functions is an example only. In one implementation, high-speed controller 208 may be coupled to memory 204, display 216 (e.g., through a graphics processor or accelerator), and to high-speed expansion ports 210, which may accept various expansion cards (not shown). In the implementation, low-speed controller 212 may be coupled to storage device 206 and to low-speed expansion port 214. Low-speed expansion port 214, which may include various communication ports (e.g., USB, Bluetooth, Ethernet, wireless Ethernet) may be coupled to one or more input/output devices, such as a keyboard, a pointing device, a scanner, or a networking device, such as a switch or router, e.g., through a network adapter.

Computing device 200 may be implemented in a number of different forms, as shown in FIG. 2. For example, it may be implemented as a standard server 220, or multiple times in a group of such servers. It may also be implemented as part of a rack server system 224. Additionally or alternatively, computing device 200 may be implemented in a personal computer, such as a laptop computer 222. Additionally or alternatively, components from computing device 200 may be combined with other components in a mobile device (not shown), such as mobile computing device 250. Each of such devices may contain one or more of computing device 200, mobile computing device 250, and/or an entire system may be made up of multiple computing devices 200 and/or mobile computing devices 250 communicating with each other.

Mobile computing device 250 may include a processor 252, a memory 264, an input/output (I/O) device such as a display 254, a communication interface 266, and a transceiver 268, among other components. Mobile computing device 250 may also be provided with a storage device, such as a microdrive or other device (not shown), to provide additional storage. Each of components 250, 252, 264, 254, 266, and 268, may be interconnected using various buses, and several of the components may be mounted on a common motherboard or in other manners as appropriate.

Processor 252 may execute instructions within mobile computing device 250, including instructions stored in memory 264. Processor 252 may be implemented as a set of chips that may include separate and multiple analog and/or digital processors. Processor 252 may provide, for example, for coordination of the other components of mobile computing device 250, such as, for example, control of user interfaces, applications run by mobile computing device 250, and/or wireless communication by mobile computing device 250.

Processor 252 may communicate with a user through control interface 258 and a display interface 256 coupled to a display 254. Display 254 may include, for example, a TFT LCD (Thin-Film-Transistor Liquid Crystal Display), an OLED (Organic Light Emitting Diode) display, and/or other appropriate display technology. Display interface 256 may comprise appropriate circuitry for driving display 254 to present graphical and other information to a user. Control interface 258 may receive commands from a user and convert them for submission to processor 252. In addition, an external interface 262 may be provide in communication with processor 252, so as to enable near area communication of mobile computing device 250 with other devices. External interface 262 may provide, for example, for wired communication in some implementations, or for wireless communication in other implementations, and multiple interfaces may also be used.

Memory 264 may store information within mobile computing device 250. Memory 264 can be implemented as one or more of a computer-readable medium or media, a volatile memory unit or units, or a non-volatile memory unit or units. Expansion memory 274 may also be provided and connected to mobile communication device 250 through expansion interface 272, which may include, for example, a SIMM (Single In Line Memory Module) card interface. Such expansion memory 274 may provide extra storage space for mobile computing device 250, or may also store applications or other information for mobile computing device 250. Specifically, expansion memory 274 may include instructions to carry out or supplement the processes described above, and may also include secure information. Thus, for example, expansion memory 274 may be provided as a security module for mobile computing device 250, and may be programmed with instructions that permit secure use of mobile computing device 250. In addition, secure applications may be provided via SIMM cards, along with additional information, such as placing identifying information on a SIMM card in a non-hackable manner.

Memory 264 and/or expansion memory 274 may include, for example, flash memory and/or NVRAM memory, as discussed below. In one implementation, a computer program product may be tangibly embodied in an information carrier. The computer program product may store instructions that, when executed, perform one or more methods, such as those described above. The information carrier may correspond to a computer- or machine-readable medium, such as the memory 264, expansion memory 274, or memory included within processor 252, that may be received, for example, over transceiver 268 or over external interface 262.

Mobile computing device 250 may communicate wirelessly through a communication interface 266, which may include digital signal processing circuitry where necessary. Communication interface 266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 268. In addition, short-range communication may occur, such as using a Bluetooth, WiFi, or other such transceiver (not shown). In addition, a Global Positioning System (GPS) receiver module 270 may provide additional navigation- and location-related wireless data to mobile computing device 250, which may be used as appropriate by applications running on mobile computing device 250.

Mobile computing device 250 may also communicate audibly using an audio codec 260, which may receive spoken information from a user and convert it to usable digital information. Audio codec 260 may likewise generate audible sound for a user, such as through a speaker, e.g., in a handset of mobile computing device 250. Such sound may include sound from voice telephone calls, may include recorded sound (e.g., voice messages, music files, etc.) and may also include sound generated by applications operating on mobile computing device 250.

Mobile computing device 250 may be implemented in a number of different forms, as shown in FIG. 2. For example, it may be implemented as a cellular telephone 280. It may also be implemented as part of a smart phone 282, a personal digital assistant, and/or other similar mobile device.

Various implementations of the systems and techniques described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and may be implemented in a high-level procedural and/or object-oriented programming language, and/or in assembly/machine language. As used herein, the terms "machine-readable medium" "computer-readable medium" may refer to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described herein may be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system may be interconnected by any form or medium of digital data communication (e.g., a communication network). Examples of communication networks include a LAN, a WAN, and the Internet.

Although FIG. 2 shows example components of computing device 200 and mobile computing device 250, computing device 200 or mobile computing device 250 may include fewer components, different components, additional components, or differently arranged components than depicted in FIG. 2. Additionally or alternatively, one or more components of computing device 200 or mobile computing device 250 may perform one or more tasks described as being performed by one or more other components of computing device 200 or mobile computing device 250.

Figure 3:
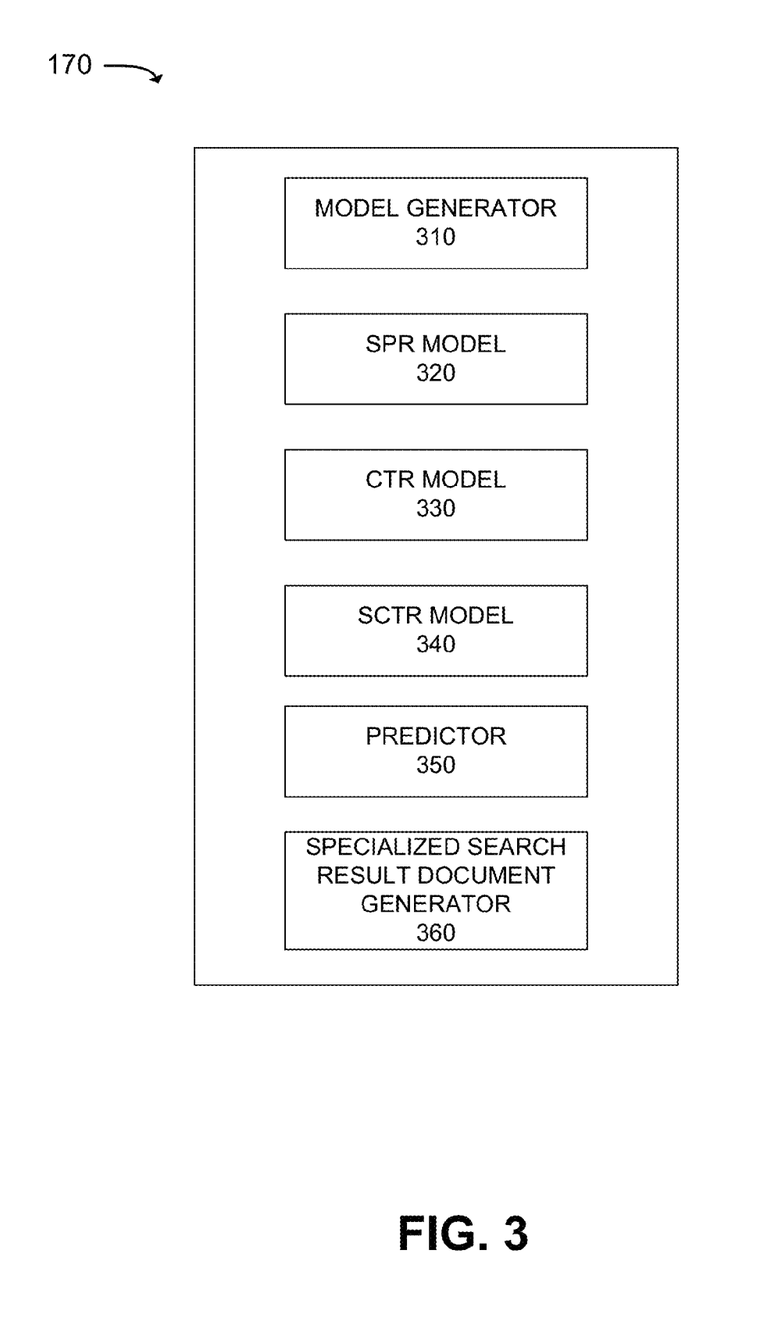
FIG. 3 is a diagram of example functional components of a machine learning system of FIG. 1.

FIG. 3 is a diagram of example functional components of second machine learning system 170. First machine learning system 140 may include the same set and/or a different set of functional components as second machine learning system 170. As shown in FIG. 3, second machine learning system 170 may include one or more of the following components: a model generator 310, a search probability ratio (SPR) model 320, a click-through ratio for a specialized search result document (CTR) model 330, a click through ratio for a specialized search engine (SCTR) model 340, a predictor 350, and a specialized search result document generator 360.

In the description to follow, CTR model 330 and SCTR model 340 will be described in the context of click-through ratios. It should be understood, however, that other types of statistics can be used instead of, or in addition to, click-through ratios. For example, a total quantity of selections of specialized search results for a particular query may be used instead of a click-through ratio for the particular query. Accordingly, one or more other types of models may be created and used by second machine learning system 170 instead of, or in addition to, SPR model 320, CTR model 330, and/or SCTR model 340.

In one implementation, the functions described in connection with FIG. 3 may be performed by one or more components of computing device 200 (FIG. 2) or one or more computing devices 200. In another implementation, one or more components of second machine learning system 170 may represent a group of computing devices dedicated to performing function(s) associated with a particular functional component.

Model generator 310 may generate SPR model 320, CTR model 330, and/or SCTR model 340. For example, model generator 310 may retrieve, from second web search engine system 150, a particular quantity of queries received by second web search engine system 150. Model generator 310 may retrieve, from language translation system 180, translations of the queries from a second language, associated with second web search engine system 150, into a first language, which is associated with first specialized search engine system 130 and first machine learning system 140. Model generator 310 may use an SPR model of first machine learning system 140 to determine SPR values for the queries based on the translations. Model generator 310 may create training data for SPR model 320 based on the queries and the SPR values received from the SPR model of first machine learning system 140. The training data may include a training set that includes an SPR value for each one of the queries. Model generator 310 may use the training data to create SPR model 320.

Similarly, model generator 310 may use a CTR model of first machine learning system 140 to determine CTR values for the queries based on the translations. Model generator 310 may create training data for CTR model 330 based on the queries and the CTR values received from the CTR model of first machine learning system 140. Model generator 310 may use the training data to create CTR model 330. Model generator 310 may also use a SCTR model of first machine learning system 140 to determine SCTR values for the queries based on the translations. Model generator 310 may create training data for SCTR model 340 based on the queries and the SCTR values received from the SCTR model of first machine learning system 140. Model generator 310 may use the training data to create SCTR model 340.

SPR model 320, CTR model 330, and/or SCTR model 340 may continuously be updated based on relevant statistics collected about queries received by second web search engine system 150 and/or second specialized search engine system 160. Updating, for example, SPR model 320 may include creating one or more new weighted rules for SPR model 320 and/or modifying one or more existing rules of SPR model 320, as described further below.

SPR model 320 may be updated based on statistics that include SPRs for different queries. An SPR may specify a ratio of a probability of a query being submitted to second web search engine system 150 and second specialized search engine system 160. The probability of the query being submitted to second web search engine system 150 may equal, for example, a quantity of times that the query was submitted to second web search engine system 150 divided by a total quantity of times that all queries were submitted to second web search engine system 150. The probability of the query being submitted to second specialized search engine system 160 may equal, for example, a quantity of times that the query was submitted to second specialized search engine system 160 divided by a total quantity of times that all queries were submitted to second specialized search engine system 160.

The SPR may reflect a ratio of the probability of the query being submitted to second specialized search engine system 160 versus the probability of the query being submitted to second web search engine system 150. For example, assume that second specialized search engine system 160 provides a product search engine. The query "running shoes" may have a relatively high probability of being submitted to second specialized search engine system 160, and a relatively low probability of being submitted to second web search engine system 150. Conversely, the query "American President" may have a relatively low probability of being submitted to second specialized search engine system 160 and a relatively high probability of being submitted to second web search engine system 150. As a result, an SPR value for "running shoes" may be much greater than an SPR value for "American President."

CTR model 330 may be updated based on statistics that include CTRs for different queries. In one example, second machine learning system 170 may determine that a query, received by second web search engine system 150, is a particular type of query, such as a product-related query. When second machine learning system 170 determines that the query is the particular type of query, second machine learning system 170 may retrieve specialized search results for the query from second specialized search engine system 160. Second machine learning system 170 may include the specialized search results in a specialized search result document, and may transmit the specialized search result document to second web search engine system 150. When second web search engine system 150 provides results for the query to, for example, user device 110, second web search engine system 150 may include the specialized search result document in a search result document that includes the results. User device 110 may present the search result document, which includes the specialized search result document. A user, of user device 110, may select one of the specialized search results from the specialized search result document.

A CTR may specify a ratio of a quantity of times that specialized search results were selected from a specialized search result document when the specialized search result document was presented for the query versus a total quantity of times that the specialized search result document was presented for the query. For example, when a specialized search result document includes specialized search results that are useful to users for a first query, a CTR is likely to be higher than when a specialized search result document includes specialized search results that are not useful to users for a second query.

SCTR model 340 may be updated based on statistics that include SCTRs for different queries. In one example, second specialized search engine system 160 may receive a query directly from user device 110. In response, second specialized search engine system 160 may provide specialized search results, for the query, directly to user device 110. A user, of user device 110, may select none or more of the specialized search results.

A SCTR may specify a ratio of a quantity of times that results were selected after a query was submitted to second specialized search engine system 160 versus a total quantity of times that the query was submitted to second specialized search engine system 160. The SCTR may reflect how useful the results are for the particular query.

Each one of SPR model 320, CTR model 330, and/or SCTR model 340 may include a set of weighted rules. A rule may be based on features that are extracted from a query. A feature may include one or more terms of a query. For example, a user may enter the query "cheap running shoes." Second machine learning system 170 may extract multiple features from the query, including terms, bigrams, and/or trigrams. A term may include a single term from the query, such as "cheap," "running," and/or "shoes." A bigram may include two terms from the query, such as "cheap running" and/or "running shoes." A trigram may include three terms from the query, such as "cheap running shoes."

Rules may be built based on regularities in training data, such as relevant statistics, provided to a model, such as SPR model 320, CTR model 330, and/or SCTR model 340. The training data may include a set of queries for which values for a signal, associated with the model, are known. The set of queries may include positive instances, which are likely to be of the particular type, and negative instances, which are not likely to be of the particular type. For example, for each feature in the training data, second machine learning system 170 may calculate whether the feature is more likely used in queries with relatively high values of the signal or with relatively low values of the signal. In one example, second machine learning system 170 may determine that the feature "cheap shoes" is likely to be used in queries with relatively high SPR values. The rules may be built automatically by using a logistic regression algorithm with a gradient ascent approach for parameter selection.

Predictor 350 may use SPR model 320, CTR model 330, and/or SCTR model 340 to predict whether a query is a particular type of query for which results are sought from second specialized search engine system 160. One or more rules of a model, such as SPR model 320, CTR model 330, and/or SCTR model 340, may be used to determine a value used to calculate a score. The score may be used to determine whether a query is a particular type of query. For example, a model may include rules that indicate whether a query is a product-related query. A first example rule may increase a value by a first amount when the query includes the term "cheap" and the term "shoes." A second example may decrease the value by a second amount when the query includes the term "cheap" and the term "tickets." A third example rule may decrease the value by a third amount when the query includes the bigram "American president."

Predictor 350 may receive a query from second web search engine system 150. Predictor 350 may extract one or more features from the query. Predictor 350 may use SPR model 320 to determine a SPR value for the query based on the features. Predictor 350 may use CTR model 330 to determine a CTR value for the query based on the features. Predictor 350 may use SCTR model 340 to determine a SCTR value for the query based on the features. Predictor 350 may use a formula to determine a score for the query based on the SPR value, the CTR value, and/or the SCTR value. Predictor 350 may predict that the query is the particular type of query when the score is, for example, greater than a particular threshold.

For example, assume that second specialized search engine system 160 is for a product search engine and that the particular type of query is a product-related query. Assume that predictor 350 receives the query "cheap running shoes." Assume that SPR model 320, CTR model 330, and/or SCTR model 340 do not store any rules that apply to the trigram "cheap running shoes." However, assume that SPR model 320, CTR model 330, and/or SCTR model 340 store rules for the bigram "running shoes" and for the term "cheap." Predictor 350 may determine a SPR value, a CTR value, and a SCTR value for the query "cheap running shoes" that are relatively high, as compared to corresponding values for other queries that are not product-related, because "running shoes" and "cheap" are often used in product-related queries. Predictor 350 may calculate a score for the query "cheap running shoes" based on the SPR value, the CTR value, and/or the SCTR value, and may determine that the query is a product-related query because the score is greater than a particular threshold.

Specialized search result document generator 360 may generate a specialized search result document for a query when predictor 350 predicts that the query is a particular type of query associated with second specialized search engine system 160. For example, specialized search result document generator 360 may receive an indication from predictor 350 that predicts that the query is the particular type of query. In response to the indication, specialized search result document generator 360 may retrieve, from second specialized search engine system 160, specialized results, such as product-related results, for the query. Specialized search result document generator 360 may generate a specialized search result document that includes one or more of the specialized results. Specialized search result document generator 360 may transmit the specialized search result document to second web search engine system 170.

Figure 4:
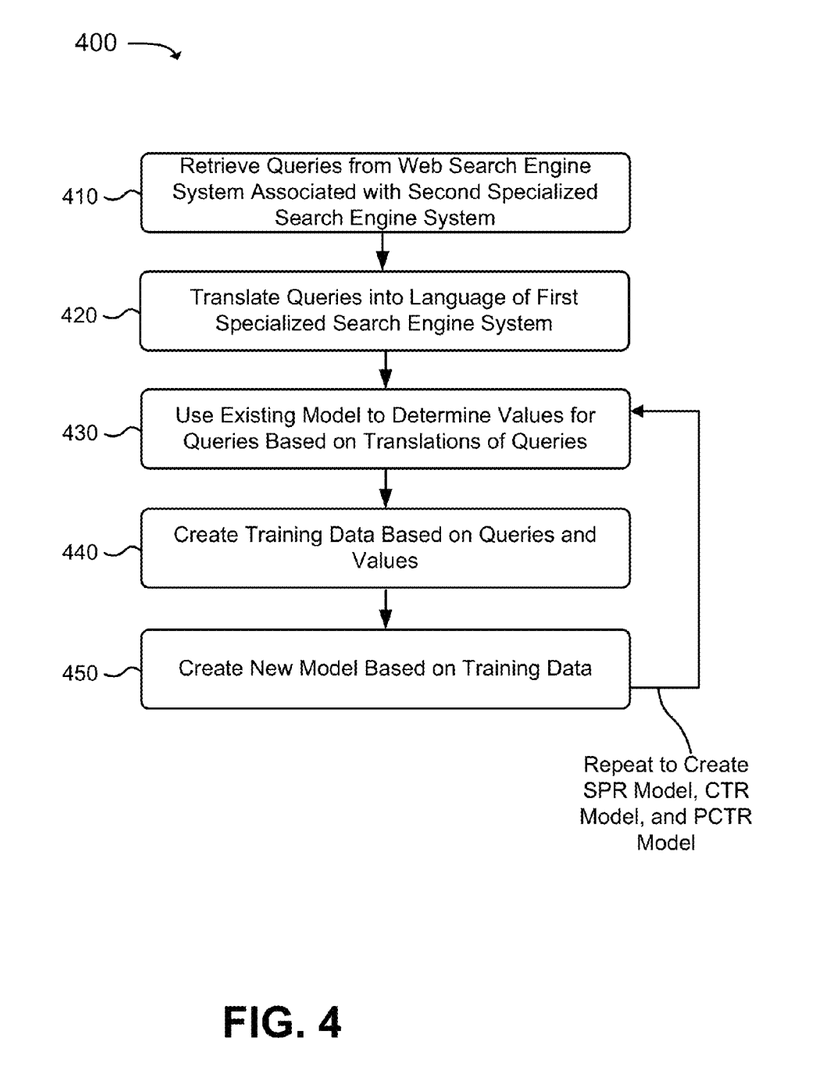
FIG. 4 is a flow chart illustrating an example process for creating models used to determine whether a query is a particular type of query.

FIG. 4 is a flow chart illustrating an example process 400 for creating models used to determine whether a query is a particular type of query. In one implementation, second machine learning system 170 may perform process 400. In other implementations, one or more other devices, separate from, or in combination with, second machine learning system 170, may perform some or all of process 400.

As shown in FIG. 4, process 400 may include retrieving queries from a web search engine system associated with a second specialized search engine system (block 410). For example, second machine learning system 170 may transmit a request for a particular quantity, such as 2 million, of the most frequently submitted queries to second web search engine system 150. Second machine learning system 170 may receive the particular quantity of the queries from second web search engine system 150. Second web search engine system 150 may be associated with second specialized search engine system 160, which is being introduced to provide a specialized search engine in a particular country. Second web search engine system 150 and second specialized search engine system 160 may be associated with domains that include a particular country code top-level domain of the particular country. The queries may be in a second language of the particular country—referred to as a "second language."

Process 400 may further including translating the queries into a language of a first specialized search engine system (block 420). For example, second machine learning system 170 may transmit, to language translation system 180, requests to translate each one the queries from the second language into a first language associated with first specialized search engine system 130. First specialized search engine system 130 may provide the same type of specialized search engine as second specialized search engine system 160 but in a different country, which uses the first language. Second machine learning system 170 may receive translations of the queries from language translation system 180.

Process 400 may also include using an existing model to determine values for the queries based on translations of the queries (block 430). For example, first machine learning system 140 may include a SPR model, a CTR model, and/or a SCTR model, as described above. Second machine learning system 170 may use the SPR model, of first machine learning system 140, to determine SPR values for the queries based on the translations. In one implementation, second machine learning system 170 may transmit a request for SPR values, which include the translated queries, to first machine learning system 140. First machine learning system 140 may use the SPR model to determine SPR values for the translated queries. First machine learning system 140 may transmit the SPR values to second machine learning system 170. In another implementation, second machine learning system 170 may retrieve the SPR model from first machine learning system 140. Second machine learning system 170 may use the retrieved SPR model to determine SPR values for the translated queries.

Process 400 may also include creating training data based on the queries and the values (block 440) and creating a new model based on the training data (block 450). For example, second machine learning system 170 may create training data by associating each one of the queries with a corresponding SPR value. In one example, second machine learning system 170 may associate the query "shoes" with an SPR value determined for the translation of the query shoes. Second machine learning system 170 may create a new SPR model, such as SPR model 320 (FIG. 3), based on the training data. Second machine learning system 170 may build rules for the new SPR model by, for example, identifying regularities in the training data. For example, second machine learning system 170 may identify, based on the training data, that queries that include the term "cheap," as a feature, have relatively high SPR values. Accordingly, second machine learning system 170 may create a rule that increases the SPR value for a query when the query includes the term "cheap" as a feature. Second machine learning system 170 may combine the rules to create the new SPR model.

Blocks 430-450 of process 400 are described above with reference to creating a new SPR model. As shown in FIG. 4, second machine learning system 170 may repeat a portion of process 400 that includes blocks 430-450 to also create a new CTR model and/or a new SCTR model for second machine learning system 170.

Second machine learning system 170 may use machine learning to create and/or maintain the new SPR model, the new CTR model, and/or the new CTR model. For example, second machine learning system 170 may determine whether a query, or feature, included in training data, is positive or negative based on a value corresponding to the query. Second machine learning system 170 may label the query with a positive indicator or a negative indicator based on the determination. In this manner, second machine learning system 170 may label each query included in the training data to create labeled training data. Second machine learning system 170 may use machine learning algorithms to create or modify a set of weighted rules, of a model, based on the labeled training data.

Figure 5:
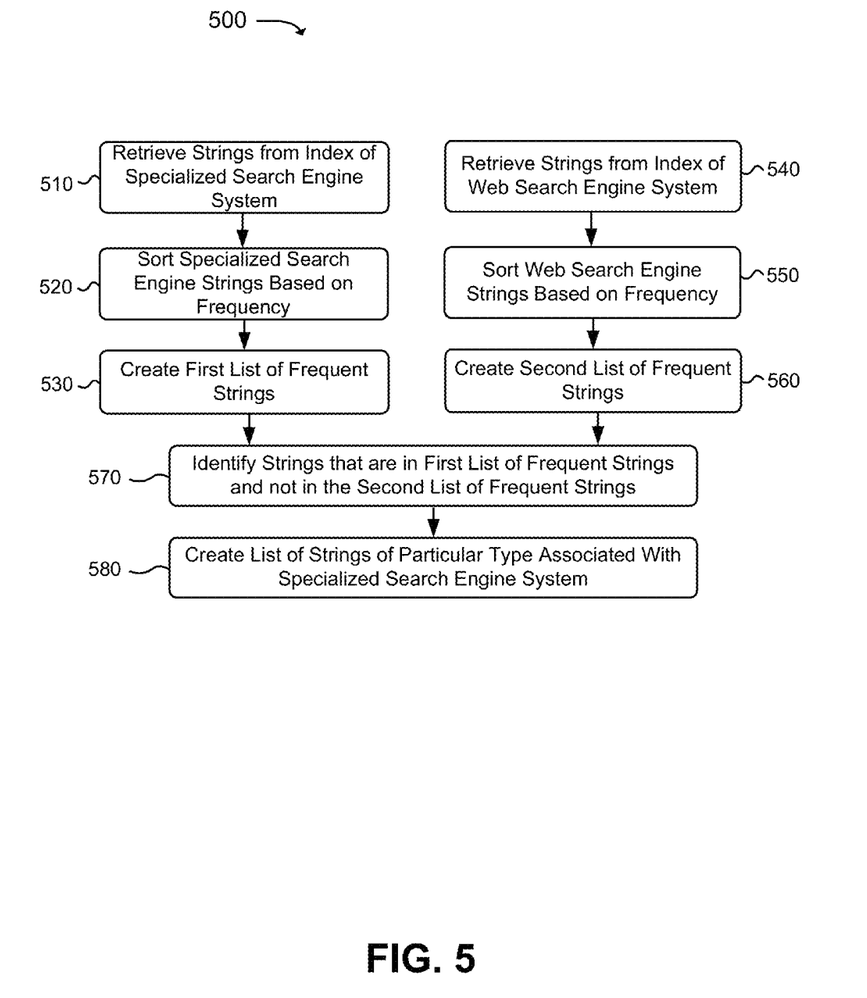
FIG. 5 is a flow chart illustrating an example process for creating a list of queries of a particular type.

FIG. 5 is a flow chart illustrating an example process 500 for creating a list of queries of a particular type. In one implementation, second machine learning system 170 may perform process 500. In other implementations, one or more other devices, separate from, or in combination with, second machine learning system 170, may perform some or all of process 500. In the description of process 500 below, strings may refer to unigrams, bigrams, and/or trigrams.

As shown in FIG. 5, process 500 may include retrieving strings from an index of a specialized search engine system (block 510) and sorting the specialized search engine strings based on frequency (block 520). For example, second specialized search engine system 160 may include or have access to an index that indexes specialized search index documents by using various keys associated with the documents. The keys may include strings, such as terms or other features, which are included in and/or are associated with the specialized search index documents. Second machine learning system 170 may retrieve the strings that are included in the index of second specialized search engine system 160. Second machine learning system 170 may sort the specialized search engine strings based on how frequently each one of the specialized search engine strings is repeated in the index of second specialized search engine system 160.

In one example, assume that the second specialized search engine system 160 provides a product search engine. Second machine learning system 170 may determine whether a query, received by second web search engine system 150, is a product-related query. Second specialized search engine system 160 may create an index when online merchants submit information about products for the product search engine. The index may include strings, such as "shoes," "furniture," "sale," "cheap," "electronics," brand names, etc. Second machine learning system 170 may retrieve those strings from the index of second specialized search engine system 160. Second machine learning system 170 may determine, for example, that the string "shoes" is repeated 10 times in the specialized search engine index and the string "furniture" is repeated 5 times in the specialized search engine index. As a result, second machine learning system 170 may sort the string "shoes" to appear before the string "furniture."Second machine learning system 170 may include, for example, the first million most frequent strings from the sorted specialized search engine strings to create the first list.

Returning to FIG. 5, process 500 may further include creating a first list of frequent strings (block 530). For example, after sorting the specialized search engine strings, second machine learning system 170 may generate a standard form of the sorted specialized search engine strings. In one example, generating the standard form of the second sorted specialized search engine strings may include, in part, removing stop words from the sorted specialized search engine strings. The stop words may include a list of words that are likely irrelevant for determining whether a query is a particular type of query associated with second specialized search engine system 160, such as "is," "the," "and," "there," "here," etc. Second machine learning system 170 may create a first list of frequent strings that includes a particular quantity of the most-frequent strings that are left in the standard form of the sorted specialized search engine strings.

Process 500 may also include retrieving strings from an index of a web search engine system (block 540); sorting the web search engine strings based on frequency (block 550); and creating a second list of frequent strings (block 560). For example, while or after creating the first list of frequent strings, second machine learning system 170 may retrieve strings that are included in an index of second web search engine system 150. Second web search engine system 150 may create the strings while crawling documents that are hosted by various web servers on a network, such as the Internet. Second machine learning system 170 may sort the web search engine strings based on how frequently each one of the web search engine strings is repeated in the index of second web search engine system 150. Thereafter, second machine learning system 170 may generate a standard form of the sorted web search engine strings by, for example, removing the stop words from the sorted web search engine strings. Second machine learning system 170 may create a second list of frequent strings that includes the particular quantity of the most-frequent strings that are left in the standard form of the sorted web search engine strings.

Process 500 may also include identifying strings that are in the first list of frequent strings and not in the second list of frequent strings (block 570) and creating a list of strings of a particular type associated with the specialized search engine system (block 580). For example, second machine learning system 170 may identify particular strings that are in the first list of frequent strings and not in the second list of frequent strings. Second machine learning system 170 may create a list of strings of the particular type, which is associated with second specialized search engine system 160, that includes the identified strings.

Further to the example above, assume that that the string "shoes" and the string "furniture" appear relatively frequently in the index of second specialized search engine system 160 and do not appear relatively frequently in the index of second web search engine system 150. Accordingly, second machine learning system 170 may identify that, for example, the string "shoes" and the string "furniture" are in the first list of frequent strings and not in the second list of frequent strings. Second machine learning system 170 may create a list of product-related strings based on the identified strings. The list of product-related strings may include the string "shoes" and the string "furniture."

After creating the list of strings of the particular type, second machine learning system 170 may receive a query from second web search engine system 150. Second machine learning system 170 may determine whether the query is of the particular type by determining whether one or more terms of the query match one or more strings in the list of strings of the particular type. Further to the example above, second machine learning system 170 may receive the query "furniture sale" from second web search engine system 150. Second machine learning system 170 may determine that the query "furniture sale" is a product-related query when the term "furniture" and/or the term "sale" are included as string(s) in the list of product-related strings.

In one implementation, second machine learning system 170 may continue using the list of the particular type until second specialized search engine system 160 and/or second machine learning system 170 collect enough statistics about queries to create models that can be used to determine whether newly received queries are of the particular type. When enough of the statistics are collected, second machine learning system 170 may create the models, such as the SPR model, the CTR model, and/or the SCTR model. After the models are created, second machine learning system 170 may use the models to determine whether the received queries are of the particular type.

Some implementations described herein may allow an operator of a specialized search engine to use existing models to create new models for determining whether queries are of a particular type associated with the specialized search engine. Other implementations described herein may allow an operator of a specialized search engine to use an index of the specialized search engine and an index of a web search engine to create a list of strings of a particular type associated with the specialized search engine. The list of strings may be used to determine whether received queries are of the particular type until sufficient statistics are collected to generate the models for the specialized search engine.

The foregoing description provides illustration and description, but is not intended to be exhaustive or to limit the embodiments to the precise form disclosed. Modifications and variations are possible in light of the above teachings or may be acquired from practice of these embodiments.

For example, while series of blocks have been described with regard to FIGS. 4 and 5, the order of the blocks may be modified in other implementations. Further, non-dependent blocks may be performed in parallel. In addition, other blocks may be provided, or blocks may be eliminated, from the described flowcharts, and other components may be added to, or removed from, the described systems.

Also, certain portions of the implementations have been described as a "component" that performs one or more functions. The term "component" may include hardware, such as a processor, an ASIC (application-specific integrated circuit), or an FPGA (field programmable gate array), or a combination of hardware and software (e.g., software running on a general purpose processor—creating a specific purpose processor).

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

It should be emphasized that the term "comprises/comprising," when used in this specification, is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by one or more computing devices, the method comprising:
    retrieving, by at least one of the one or more computing devices, a particular quantity of queries received by a first web search engine,
    the queries being in a first language;
    determining, by at least one of the one or more computing devices, translations of the queries from the first language into a second language associated with a first specialized search engine to obtain translated queries;
    using, by at least one of the one or more computing devices, a first model, associated with the first specialized search engine, to determine values for the translated queries,
    a first value of the values, corresponding to a first translated query of the translated queries, reflecting a probability that the first translated query is a type of query for which first specialized search results are responsive;
    creating, by at least one of the one or more computing devices, training data based on the queries and the values;
    creating, by at least one of the one or more computing devices, rules for a second model based on the training data;
    receiving, by at least one of the one or more computing devices, a particular query from the first web search engine;
    determining, by at least one of the one or more computing devices and based on the second model, that the particular query is the type of query for which second specialized search results, from a second specialized search engine, are responsive; and
    providing, by at least one of the one or more computing devices, one or more of the second specialized search results after determining that the particular query is the type of query for which the second specialized search results are responsive.

2. The method of claim 1,
    where the first specialized search engine is a product search engine, and
    where the type of query is a product-related type of query.

3. The method of claim 1, where determining that the particular query is the type of query for which the second specialized search results are responsive includes:
    using the second model to determine a particular value for the particular query;
    generate a score for the particular query based on the particular value; and
    determine that the particular query is the type of query for which the second specialized search results are responsive based on the score being greater than a particular threshold.

4. The method of claim 1,
    where the second specialized search results are provided by the second specialized search engine associated with the first language, and
    where the first specialized search results are provided by the first specialized search engine.

5. The method of claim 1,
    where the first specialized search engine is associated with a domain that includes a first country code top-level domain, and
    where the first web search engine and the second specialized search engine are associated with domains that include a second country code top-level domain, and
    where the first country code top-level domain is different from the second country code top-level domain.

6. The method of claim 1, where creating the training data comprises:
    identifying the first value determined for the first translated query, and
    associating the first value with a first query, of the queries, corresponding to the first translated query.

7. The method of claim 1, where the first model and the second model are of a same type.

8. The method of claim 1,
where the first model is used to predict whether a particular query, received by a second web search engine, is the type of query for which the first specialized search results are responsive, and
where the second web search engine is associated with the first specialized search engine.

9. The method of claim 8, where the first model is one of:
a search probability ratio (SPR) model that is based on a first quantity of times that the queries are received by the second web search engine and a second quantity of times that the queries are received by the first specialized search engine,
a click through ratio (CTR) model that is based on a first quantity of selections when particular queries are received by the second web search engine and a search result document, provided by the second web search engine, includes results provided by the first specialized search engine, or
a specialized search click through ratio (SCTR) model that is based on a second quantity of selections when the particular queries are received by the first specialized search engine and second results are provided by the first specialized search engine.

10. A non-transitory computer-readable medium storing instructions, the instructions comprising:
one or more instructions that, when executed by at least one processor, cause the at least one processor to:
retrieve first strings from a first index associated with a specialized search engine;
sort the first strings based on frequencies of the first strings in the first index;
create a first list based on the sorted first strings;
retrieve second strings from a second index associated with a web search engine;
sort the second strings based on frequencies of the second strings in the second index;
create a second list based on the sorted second strings;
identify one or more strings that are in the first list and that are not in the second list;
create, based on the identified one or more strings, a list of strings associated with the specialized search engine;
receive, from a computer device, a query when the query is submitted to the web search engine;
determine whether one or more terms of the query are in the list of strings associated with the specialized search engine; and
provide one or more results from the specialized search engine when the one or more terms of the query are in the list of strings.

11. The non-transitory computer-readable medium of claim 10,
where the specialized search engine is a product search engine, and
where the one or more results are associated with one or more products.

12. The non-transitory computer-readable medium of claim 10, where the first strings and the second strings are one or more of unigrams, bigrams, or trigrams.

13. The non-transitory computer-readable medium of claim 10, where the one or more instructions to create the first list comprise:
one or more instructions that, when executed by the at least one processor, cause the at least one processor to:
eliminate stop words from the sorted first strings.

14. The non-transitory computer-readable medium of claim 10, where the one or more instructions to provide the one or more results from the specialized search engine comprise:
one or more instructions that, when executed by the at least one processor, cause the at least one processor to:
identify specialized search results, from the specialized search engine, for the query,
the specialized search results including the one or more results,
generate a specialized search result document that includes the one or more results, and
provide the specialized search result document to the computer device.

15. A system comprising:
one or more processors to:
retrieve queries received by a web search engine,
the queries being in a first language;
determine translations of the queries from the first language into a second language, associated with a first specialized search engine, to obtain translated queries;
use a first model, associated with the first specialized search engine, to determine values for the translated queries;
a first value of the values, corresponding to a first translated query of the translated queries, reflecting a probability that the first translated query is a type of query for which first specialized search results are responsive,
create training data based on the queries and the values;
create a second model based on the training data;
receive a particular query for the web search engine;
determine, based on the second model, that the particular query is the type of query for which second specialized search results, from a second specialized search engine, are responsive,
the first specialized search engine being different from the second specialized search engine; and
provide one or more of the second specialized search results after determining that the particular query is the type of query for which the second specialized search results are responsive.

16. The system of claim 15,
where the first specialized search engine is a product search engine, and
where the type of query, for which the first specialized search results are responsive, is a query for which product results are responsive.

17. The system of claim 15,
where the web search engine is associated with a first domain that includes a first country code top-level domain, and
where the first specialized search engine is associated with a second domain that includes a second country code top-level domain, and
where the first country code top-level domain is different from the second country code top-level domain.

18. The system of claim 15, where, when determining that the particular query is the type of query for which the second specialized search results are responsive, the one or more processors are to:
use the second model to determine a particular value for the particular query;
generate a score for the particular query based on the particular value; and determine that the particular query is the type of query for which the second specialized search results are responsive based on the score being greater than a particular threshold.

19. The system of claim 15, where the one or more processors are to:
  determine statistics for the particular query, and
  update the second model based on the statistics.

20. The system of claim 19, where the statistics comprise one or more of:
  first data based on a first quantity of times that the particular query is received by the web search engine and a second quantity of times that the particular query is received by the second specialized search engine that provides the second specialized search results,
  second data based on a first quantity of selections when the particular query is received by the web search engine and first results provided by the web search engine include one or more of the second specialized search results, or
  third data based on a second quantity of selections when the particular query is received, from a computer device of a user, by the second specialized search engine and the second specialized search engine provides, to the computer device of the user, one or more of the second specialized search results.

* * * * *